United States Patent
Seong et al.

(10) Patent No.: US 9,653,712 B2
(45) Date of Patent: May 16, 2017

(54) BATTERY MODULE HAVING ASSEMBLY COUPLING STRUCTURE

(71) Applicant: LG CHEM, LTD., Seoul (KR)

(72) Inventors: Jun Yeob Seong, Daejeon (KR); Dal Mo Kang, Daejeon (KR); Byung O Kong, Daejeon (KR); Youngsop Eom, Daejeon (KR)

(73) Assignee: LG CHEM, LTD., Seoul (KR)

( * ) Notice: Subject to any disclaimer, the term of this patent is extended or adjusted under 35 U.S.C. 154(b) by 170 days.

(21) Appl. No.: 14/584,666

(22) Filed: Dec. 29, 2014

(65) Prior Publication Data

US 2015/0118541 A1   Apr. 30, 2015

Related U.S. Application Data

(63) Continuation of application No. PCT/KR2013/007117, filed on Aug. 7, 2013.

(30) Foreign Application Priority Data

Aug. 17, 2012   (KR) .................. 10-2012-0090152

(51) Int. Cl.
  *H01M 2/02*   (2006.01)
  *H01M 2/10*   (2006.01)
  (Continued)

(52) U.S. Cl.
  CPC ....... *H01M 2/0247* (2013.01); *B60L 11/1864* (2013.01); *B60L 11/1874* (2013.01);
  (Continued)

(58) Field of Classification Search
  CPC .... H01M 2/0247; H01M 2/02; H01M 2/1077; H01M 2/10; H01M 10/052;
  (Continued)

(56) References Cited

U.S. PATENT DOCUMENTS

| 5,998,060 A | 12/1999 | McGrady |
| 2004/0016455 A1* | 1/2004 | Oogami .................. H01M 2/02 |
| | | 136/244 |

(Continued)

FOREIGN PATENT DOCUMENTS

| DE | 102007063185 A1 | 2/2009 |
| DE | 102010061865 | * 5/2012 .............. H01M 2/10 |

(Continued)

OTHER PUBLICATIONS

International Search Report issued in PCT/KR2013/007117, dated Nov. 22, 2013.

*Primary Examiner* — Patrick Ryan
*Assistant Examiner* — Aaron Greso
(74) *Attorney, Agent, or Firm* — Birch, Stewart, Kolasch & Birch, LLP

(57) ABSTRACT

Disclosed herein is a battery module including a battery cell array including two or more stacked battery cells, each of which is configured to have a structure in which an electrode assembly, including a cathode, an anode, and a separator disposed between the cathode and the anode, is received in a battery case together with an electrolyte in a sealed state, and fixing members, each of which is integrally coupled to a portion or the entirety of an outer edge of a corresponding one of the battery cells, each of the fixing members being provided with an assembly type coupling structure, by which the fixing members are coupled to each other such that the battery cell array forms a stable stack structure.

17 Claims, 6 Drawing Sheets

(51) Int. Cl.
  *B60L 11/18* (2006.01)
  *H01M 10/052* (2010.01)

(52) U.S. Cl.
  CPC ....... *B60L 11/1879* (2013.01); *H01M 2/1077* (2013.01); *H01M 10/052* (2013.01); *H01M 2220/10* (2013.01); *H01M 2220/20* (2013.01); *Y02E 60/122* (2013.01); *Y02P 70/54* (2015.11); *Y02T 10/7011* (2013.01); *Y02T 10/7061* (2013.01)

(58) Field of Classification Search
  CPC .......... H01M 2220/20; H01M 2220/10; B60L 11/1864; B60L 11/1874; B60L 11/1879; Y02T 10/7061; Y02T 10/7005; Y02T 10/7011; Y02P 70/54
  See application file for complete search history.

(56) References Cited

U.S. PATENT DOCUMENTS

| | | | |
|---|---|---|---|
| 2006/0286450 A1* | 12/2006 | Yoon | H01M 2/021 429/180 |
| 2008/0220315 A1 | 9/2008 | Dougherty et al. | |
| 2010/0273044 A1* | 10/2010 | Culver | H01M 2/24 429/160 |
| 2010/0297482 A1 | 11/2010 | Yoon et al. | |
| 2011/0076541 A1 | 3/2011 | Meintschel et al. | |
| 2011/0256446 A1 | 10/2011 | Bronczyk et al. | |
| 2012/0040223 A1* | 2/2012 | Odumodu | H01M 2/1077 429/120 |
| 2012/0171554 A1* | 7/2012 | Kim | H01M 2/0245 429/159 |
| 2013/0149577 A1 | 6/2013 | Lee et al. | |
| 2013/0229147 A1 | 9/2013 | Amagai et al. | |
| 2013/0313754 A1* | 11/2013 | Heckenberger | H01M 2/0262 264/328.17 |

FOREIGN PATENT DOCUMENTS

| | | | | |
|---|---|---|---|---|
| JP | 2001-236937 A | | 8/2001 | |
| JP | 2006-172882 A | | 6/2006 | |
| JP | 2006-236605 A | | 9/2006 | |
| JP | 4965012 B2 | | 7/2012 | |
| KR | 10-2009-0052802 A | | 5/2009 | |
| KR | 10-2012-0016350 A | | 2/2012 | |
| KR | 10-2012-0033044 A | | 4/2012 | |
| WO | WO 2005/074054 | * | 8/2005 | .............. H01M 2/02 |
| WO | WO 2005/074054 A1 | | 8/2005 | |
| WO | WO 2012/066882 A1 | | 5/2012 | |

* cited by examiner

BATTERY MODULE HAVING ASSEMBLY COUPLING STRUCTURE

CROSS REFERENCE TO RELATED APPLICATIONS

This application is a Continuation of PCT International Application No. PCT/KR2013/007117 filed on Aug. 7, 2013, which claims priority under 35 U.S.C. §119(a) to Patent Application No. 10-2012-0090152 filed in the Republic of Korea on Aug. 17, 2012, all of which are hereby expressly incorporated by reference into the present application.

TECHNICAL FIELD

The present invention relates to a battery module having an assembly coupling structure and, more particularly, to a battery module including a battery cell array including two or more stacked battery cells, each of which is configured to have a structure in which an electrode assembly is received in a battery case together with an electrolyte in a sealed state, and fixing members, each of which is integrally coupled to a portion or the entirety of an outer edge of a corresponding one of the battery cells by insert injection molding, each of the fixing members being provided with an assembly type coupling structure, by which the fixing members are coupled to each other such that the battery cell array forms a stable stack structure.

BACKGROUND ART

In recent years, secondary batteries have attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several battery cells for each device. On the other hand, middle or large-sized devices, such as vehicles, use a battery module having a plurality of battery cells electrically connected to each other because high output and large capacity are necessary for the middle or large-sized devices.

Preferably, the battery module is manufactured so as to have as small a size and weight as possible. For this reason, a prismatic battery or a pouch-shaped battery, which can be stacked with high integration and has a small weight to capacity ratio, is usually used as a battery cell of the battery module. In particular, much interest is currently focused on the pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

In order for the battery module to provide output and capacity required by a specific apparatus or device, it is necessary for the battery module to be configured to have a structure in which a plurality of battery cells is electrically connected in series to each other and the battery cells are stable against external force.

In a case in which a battery module is manufactured using a plurality of battery cells, therefore, a plurality of members for mechanical fastening and electrical connection between the battery cells is generally needed and, as a result, a process of assembling the mechanical fastening and electrical connection members is very complicated. Furthermore, there is needed a space for coupling, welding, or soldering the mechanical fastening and electrical connection members with the result that the total size of a system is increased. The increase in size of the system is not preferable in the terms of spatial limitations of an apparatus or device in which a middle or large-sized battery module is installed. Moreover, the middle or large-sized battery module must be configured to have a more compact structure such that the middle or large-sized battery module can be effectively installed in a limited inner space, such as a vehicle.

In particular, a plurality of parts is needed to stack a plurality of battery cells in a fixed state. For example, it is necessary to accurately and stably fix the battery cells in place using battery cell fixing parts. As a result, an assembly process is complicated and difficulty of a manufacturing process is increased. In addition, the volume and weight of the battery module are increased and the manufacturing cost of the battery module is raised.

Therefore, there is a high necessity for a battery module which can be manufactured to have a simple and compact structure and in which the number of parts constituting the battery module is reduced to improve efficiency of an assembly process while decreasing the manufacturing cost of the battery module.

DISCLOSURE

Technical Problem

The present invention has been made to solve the above problems and other technical problems that have yet to be resolved.

Specifically, it is an object of the present invention to provide a battery module configured such that the number of parts for fixing battery cells to form a stacked structure is reduced, thereby improving manufacturing processability.

It is another object of the present invention to provide a battery module configured such that the structural stability of the battery module is improved while overall volume and weight of the battery module are not increased when battery cells are stacked to constitute the battery module.

Technical Solution

In accordance with one aspect of the present invention, the above and other objects can be accomplished by the provision of a battery module including a battery cell array including two or more stacked battery cells, each of which is configured to have a structure in which an electrode assembly, including a cathode, an anode, and a separator disposed between the cathode and the anode, is received in a battery case together with an electrolyte in a sealed state, and fixing members, each of which is integrally coupled to a portion or the entirety of an outer edge of a corresponding one of the battery cells, each of the fixing members being provided with an assembly type coupling structure, by which the fixing members are coupled to each other such that the battery cell array forms a stable stack structure.

In the present invention as described above, each fixing member is provided with an assembly type coupling structure, by which a plurality of fixing members is coupled to each other. Consequently, it is possible to easily and simply achieve coupling between the fixing members without a necessity of providing additional fixing member fastening means.

Coupling between the outer edge of each of the battery cells and a corresponding one of the fixing members may be achieved using various methods, such as assembly, bonding, and molding. Preferably, the outer edge of each of the battery cells and a corresponding one of the fixing members are integrally coupled to each other by insert injection molding.

That is, in a case in which the outer edge of each of the battery cells and a corresponding fixing member are integrally coupled to each other by insert injection molding, the fixing members can be stably coupled to the respective battery cells without carrying out a process of fixing the fixing members to the respective battery cells in place during a conventional process of assembling the battery module.

In a concrete example, each of the battery cells may be a plate-shaped battery cell that is capable of providing a high stacking rate in a limited space and the plate-shaped battery cells may be stacked such that one side or opposite sides of one battery cell face a corresponding side or corresponding sides of another adjacent battery cell(s) to form the battery cell array.

For example, each of the battery cells may be a pouch-shaped battery cell configured to have a structure in which an electrode assembly is mounted in a battery case made of a laminate sheet including a resin layer and a metal layer.

Specifically, each of the battery cells may be a pouch-shaped battery cell configured to have a structure in which an electrode assembly of a cathode/separator/anode structure is received in a battery case together with an electrolyte in a sealed state. For example, each of the battery cells may be a plate-shaped battery cell configured to have an approximately rectangular hexahedral structure having a small thickness to width ratio. In general, the pouch-shaped battery cell includes a pouch-shaped battery case. The battery case is configured to have a laminate sheet structure in which an outer coating layer formed of a polymer resin exhibiting high durability, a barrier layer formed of a metal material blocking moisture or air, and an inner sealant layer formed of a thermally bondable polymer resin are sequentially stacked.

The battery case of the pouch-shaped battery cell may be configured to have various structures. For example, the battery case of the pouch-shaped battery cell may be a two-unit member configured to have a structure in which an electrode assembly is received in a receiving part formed at an upper inner surface and/or a lower inner surface of the battery case and upper and lower contact regions of the outer edge of the battery case are sealed by thermal bonding. The pouch-shaped battery cell with the above-stated construction is disclosed in PCT International Application No. PCT/KR2004/003312, which has been filed in the name of the applicant of the present patent application. The disclosure of the above-mentioned patent application is hereby incorporated by reference as if fully set forth herein. Alternatively, as shown in FIG. 2, the battery case may be a one-unit member configured to have a structure in which an electrode assembly is received in a receiving part formed at an upper inner surface and/or a lower inner surface of the battery case and the upper and lower contact regions of the outer edge of the battery case are sealed by thermal bonding.

The pouch-shaped battery cells are stacked in a state in which the pouch-shaped battery cells are fixed by the respective fixing members. Specifically, each of the fixing members may be integrally coupled to a corresponding one of the pouch-shaped battery cells such that each of the fixing members covers the outer edge of a corresponding one of the pouch-shaped battery cells sealed by thermal bonding.

Each of the battery cells may be configured to have a structure in which a cathode terminal and an anode terminal protrude from one side of the outer edge thereof or a structure in which a cathode terminal protrudes from one side of the outer edge thereof and an anode terminal protrudes from the opposite side of the outer edge thereof. In this case, each of the fixing members may be integrally coupled to the outer edge of a corresponding one of the battery cells excluding the cathode terminal and the anode terminal.

In a concrete example, the assembly type coupling structure may include a combination of a fastening member formed at one side of each of the fixing members and a fastening groove formed at the other side of each of the fixing members such that the fastening groove corresponds to the fastening member. For example, the fastening member may be formed at the top or the bottom of each of the fixing members and the fastening groove may be formed at the bottom or the top of each of the fixing members on a position corresponding to the fastening member. When the fixing members are stacked and assembled, therefore, the assembly type coupling structure is formed by coupling between the fastening members and the fastening grooves of the upper fixing member and the lower fixing member.

As a concrete example of the assembly type coupling structure, the fastening member may be formed in the shape of a cylinder protruding from one side of each of the fixing members and may include a hook tapered along an outer circumference of an upper end of the cylinder and, in addition, the fastening groove may be formed at the other side of each of the fixing members opposite to the fastening member in a cylindrically depressed shape and may be provided at an inner circumference thereof with a catching protrusion, to which the hook of the fastening member is fastened.

In this case, the hook may be provided at the upper part thereof with one or more hollow portions, by which the hook is elastically fastened into the fastening groove. In addition, the fastening member and the fastening groove may be formed at corner portions of each of the fixing members.

In another concrete example, the fastening member may be formed in a wedge shape protruding while abutting on one side of each of the fixing members and may include a hook tapered outwardly of each of the fixing members and, in addition, the fastening groove may be formed at the other side of each of the fixing members opposite to the fastening member in a depressed shape corresponding to the wedge shape and may be provided with an opening, into which the hook of the fastening member is fastened.

The position and number of the fastening members and the fastening grooves are not particularly restricted so long as the fixing members can be stably coupled to each other by the fastening members and the fastening grooves. For example, one or more fastening members and one or more fastening grooves may be formed at an edge of each of the fixing members.

Preferably, however, the fastening member and the fastening groove of the assembly type coupling structure are integrally formed at each of the fixing members. That is, in a case in which the fastening member and the fastening groove are included as integrated portions of each of the fixing members, it is possible to assemble and fasten the battery cells without using additional separate members.

The material for each of the fixing members is not particularly restricted. For example, each of the fixing members may be made of rubber or plastic. More specifically, each of the fixing members may be made of thermo plastic polyurethane (TPU), silicone, etc. The fixing members, each of which is made of such an elastic material, may correctly fix the battery cell array without applying excessive pressure to the battery cell array and absorb impact when external force and vibration are applied to the battery cell array, thereby improving stability of the battery cells.

On the other hand, a cooling fin may be disposed at an interface between the respective battery cells such that heat from the battery cells is conducted to the cooling fin. The cooling fin may be a metal sheet exhibiting high thermal conductivity. The cooling fin may be configured to have a structure in which an end of the cooling fin protrudes outward from the battery cell array or is connected to an additional cooling member such that heat generated from the battery cells can be discharged out of the battery cell array.

The battery cells are not particularly restricted so long as the battery cells provide high voltage and high current when a battery module or a battery pack is constituted by the battery cells. For example, each of the battery cells may be a lithium secondary battery having a large energy storage quantity per volume.

In accordance with another aspect of the present invention, there is provided a battery pack including the battery module with the above-stated construction as a unit module.

The battery pack may be manufactured by combining the secondary batteries as unit modules based on desired output and capacity. In addition, the battery pack according to the present invention may be used as a power source for an electric vehicle, a hybrid electric vehicle, a plug-in hybrid electric vehicle, or a power storage device in consideration of installation efficiency and structural stability. However, an applicable range of the battery pack according to the present invention is not limited thereto.

In accordance with a further aspect of the present invention, there is provided a device including the battery pack with the above-stated construction as a power source. Specifically, the device may be an electric vehicle, a hybrid electric vehicle, a plug-in hybrid electric vehicle, or a power storage device.

The structure and manufacturing method of the device are well known in the art to which the present invention pertains and, therefore, a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
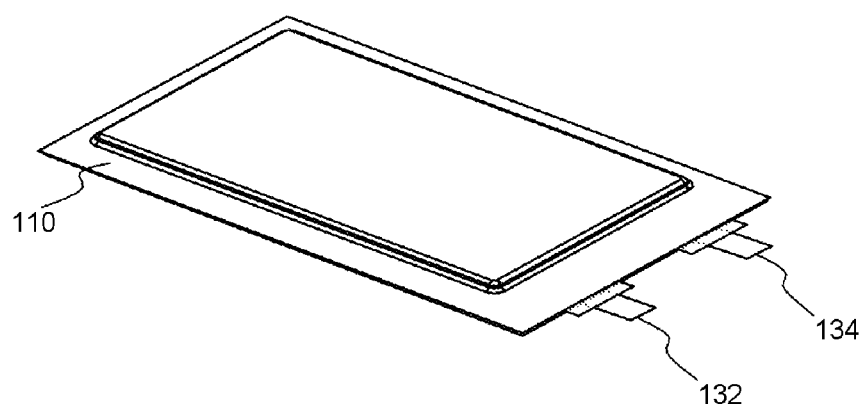
FIG. 1 is a perspective view showing an exemplary battery cell, which will be mounted in a battery module.
Figure 2:
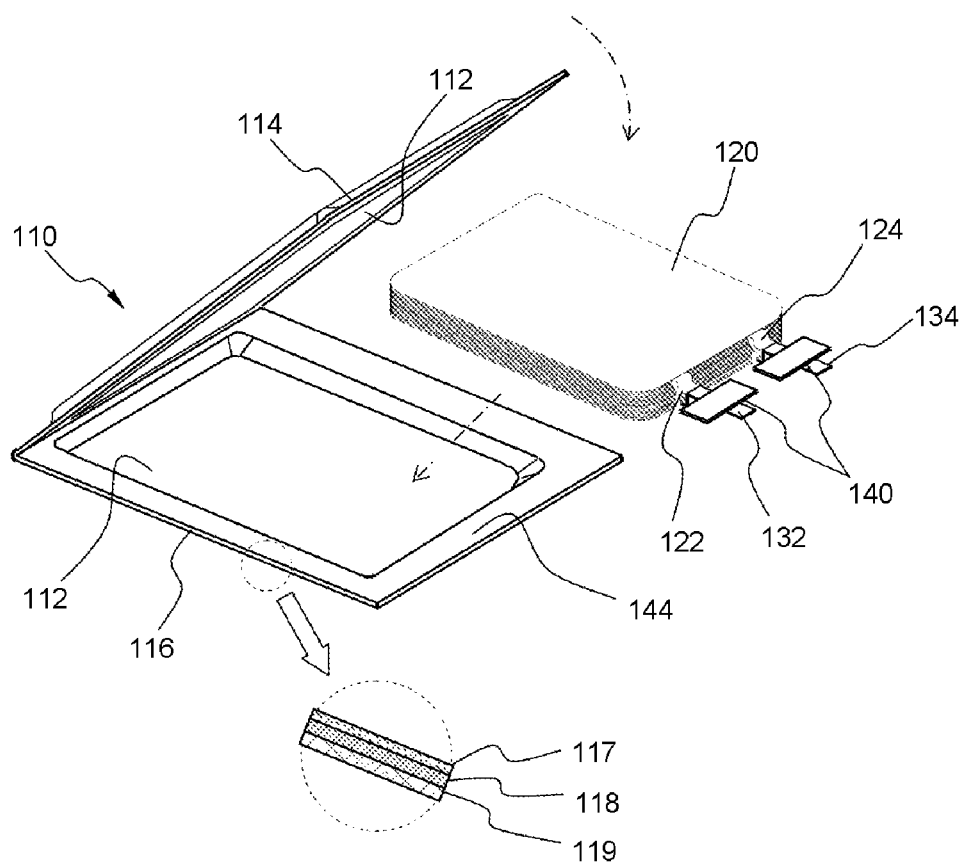
FIG. 2 is an exploded perspective view showing the battery cell of FIG. 1.

FIG. 1 is a perspective view typically showing an exemplary battery cell, which will be mounted in a battery module according to the present invention, and FIG. 2 is an exploded perspective view typically showing the battery cell of FIG. 1.

Referring to these figures, a pouch-shaped battery cell 100 is configured to have a structure in which an electrode assembly 120, including cathodes, anodes, and separators disposed respectively between the cathodes and the anodes, is mounted in a pouch-shaped battery case 110 in a sealed state such that two electrode terminals 132 and 134 electrically connected to cathode and anode tabs 122 and 124 of the electrode assembly 120 are exposed to the outside.

The battery case 110 includes an upper case 114 and a lower case 116, each of which has a depressed receiving part 112, in which the electrode assembly 120 is located.

The cathode tabs 122 and the anode tabs 124 of the electrode assembly 120, which is configured to have a folded type structure, a stacked type structure, or a stacked/folded type structure, are respectively coupled to the electrode terminals 132 and 134 by fusing. In addition, insulating films 140 are attached to the top and bottom of each of the electrode terminals 132 and 134 to prevent the occurrence of a short circuit between a thermal bonding device and the electrode terminals 132 and 134 and to secure sealing between the electrode terminals 132 and 134 and the battery case 110 when outer edges of the upper case 114 and the lower case 116 are thermally bonded to each other using the thermal bonding device.

The upper case 114 and the lower case 116 each include an outer resin layer 117, an isolation metal layer 118, and an inner resin layer 119. The inner resin layer 119 of the upper case 114 and the inner resin layer 119 of the lower case 116 are fixed to each other in tight contact by heat and pressure generated from the thermal bonding device (not shown).

A sealed portion is formed by thermally bonding the outer edges of the upper case 114 and the lower case 116 in a state in which the electrode assembly 120, which is impregnated with an electrolyte, is located in the receiving part 112.

Figure 3:
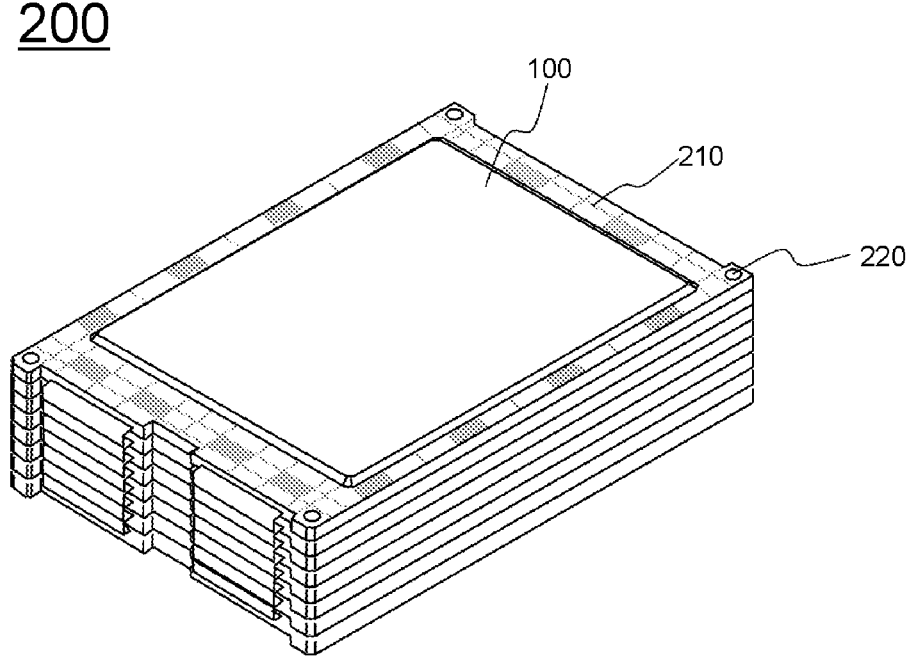
FIG. 3 is a perspective view showing a battery module according to an embodiment of the present invention.
Figure 4:
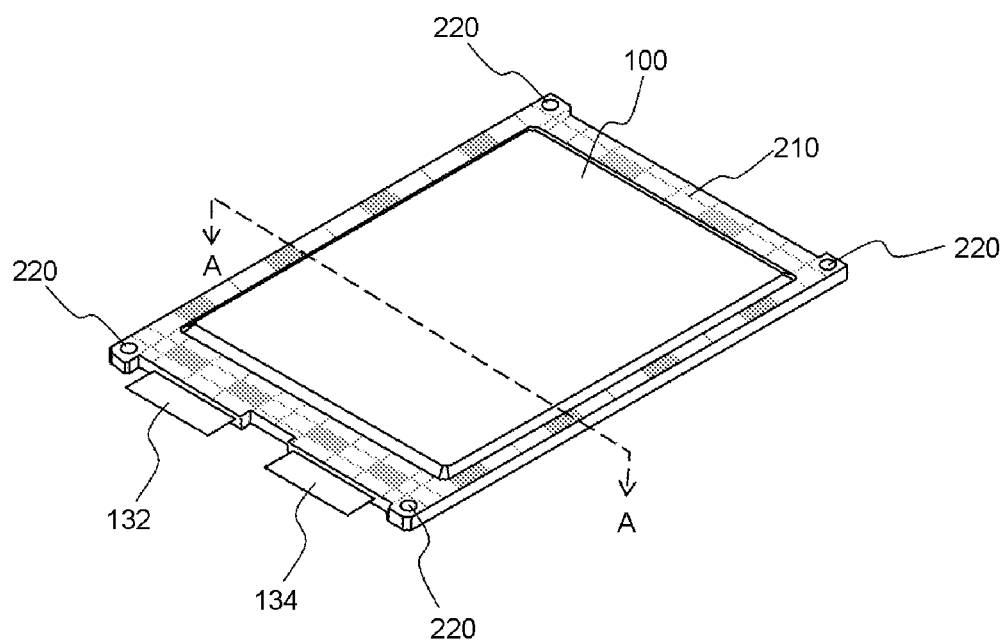
FIG. 4 is a perspective view showing a structure in which a fixing member is coupled to a battery cell.

FIG. 3 is a perspective view showing a battery module according to an embodiment of the present invention and FIG. 4 is a perspective view showing a structure in which a fixing member is coupled to a battery cell.

For the convenience of description, a housing, a cable, a protection circuit, etc., which are generally included in a battery module, are omitted from FIG. 3.

Referring to FIGS. 3 and 4, a battery module 200 is configured to have a structure in which a plurality of battery cells 100 is stacked to form a battery cell array and a fixing member 210 is coupled to each of the battery cells 100. The battery cells 100 are plate-shaped battery cells 100 providing a high stacking rate in a limited space. The plate-shaped battery cells 100 are stacked such that one side or opposite sides of one battery cell 100 face a corresponding side or corresponding sides of another adjacent battery cell(s) 100 to form a battery cell array.

The outer edge of each of the battery cells 100 is integrally coupled to a fixing member 210 by insert injection molding. The fixing member 210 is integrally provided with an assembly type coupling structure 220, by which the fixing members 210 are coupled to one another. The fixing members 210 are coupled and fixed to one another by the assembly type coupling structure 220 in a state in which the fixing members 210 are stacked in a vertical direction.

The assembly type coupling structure 220 includes a combination of a fastening member formed at one side of each of the fixing members 210 and a fastening groove formed at the other side of each of the fixing members 210 such that the fastening groove corresponds to the fastening member. That is, the fastening member is formed at the top of each of the fixing members 210 and the fastening groove is formed at the bottom of each of the fixing members 210 on a position corresponding to the fastening member. When the fixing members 210 are stacked and assembled, therefore, the assembly type coupling structure 220 is formed by coupling between the fastening members and the fastening grooves of the upper fixing member 210 and the lower fixing member 210. A concrete example of the assembly type coupling structure will hereinafter be described in detail with reference to FIGS. 7 and 9.

Figure 5:
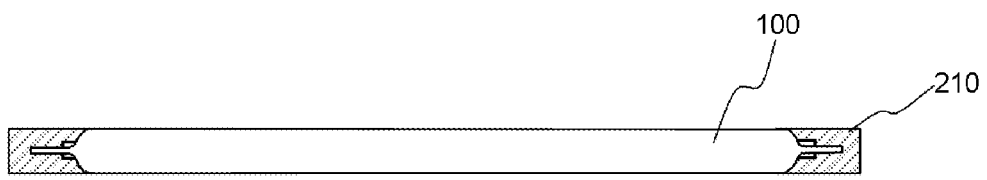
FIG. 5 is a vertical sectional view taken along line A-A of FIG. 4.

FIG. 5 is a vertical sectional view taken along line A-A of FIG. 4.

Referring to FIG. 5 together with FIG. 4, a pouch-shaped battery cell 100 is configured such that a plurality of pouch-shaped battery cells 100 is stacked in a state in which the pouch-shaped battery cells 100 are fixed by corresponding fixing members 210. The fixing member 210 is integrally coupled to the pouch-shaped battery cell 100 such that the fixing member 210 covers an outer edge of the pouch-shaped battery cell 100 sealed by thermal bonding. That is, the fixing member 210 is integrally coupled to the entirety of the outer edge of the battery cell 100 excluding the cathode terminal 132 and the anode terminal 134 of the battery cell 100. This coupling structure is formed by insert injection molding.

Figure 6:
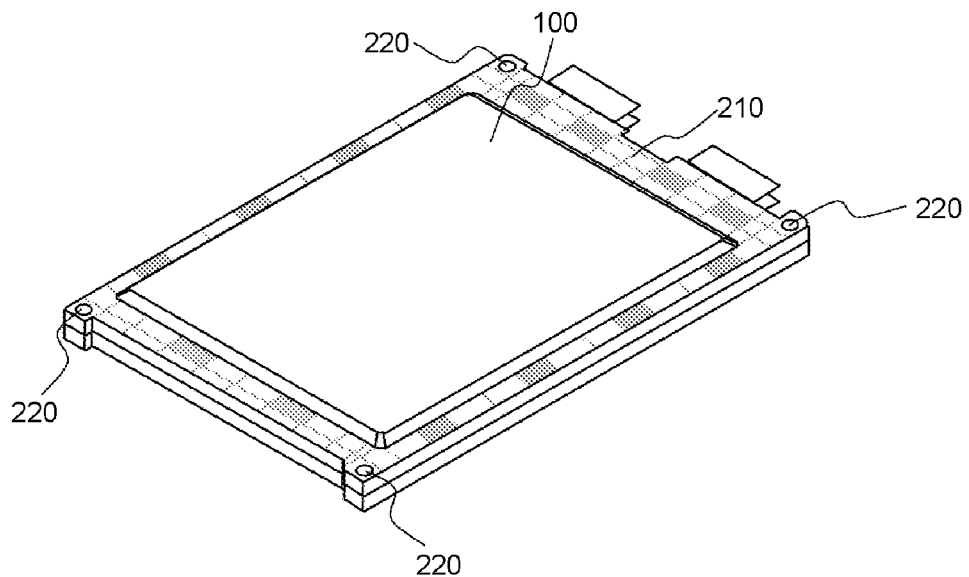
FIG. 6 is a perspective view showing a structure in which two battery cells, one of which is shown in FIG. 4 in a state in which the fixing member is coupled to the battery cell, are stacked.
Figure 7:
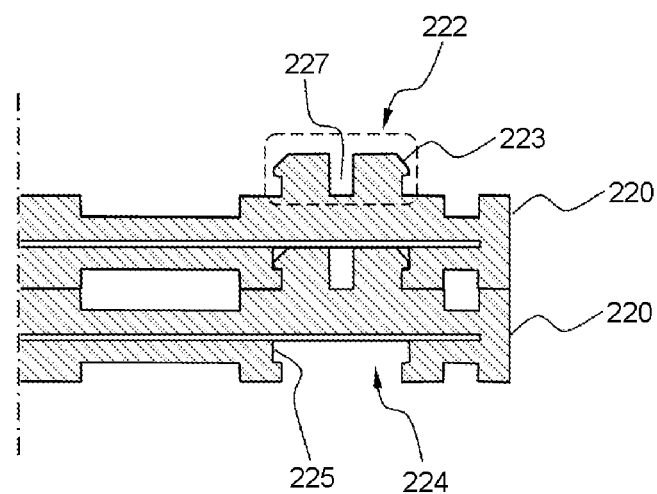
FIG. 7 is a vertical sectional view typically showing an assembly coupling structure of FIG. 6.

FIG. 6 is a perspective view showing a structure in which two battery cells 100, one of which is shown in FIG. 4 in a state in which the fixing member 210 is coupled to the battery cell 100, are stacked and FIG. 7 is a vertical sectional view typically showing an assembly type coupling structure of FIG. 6

A fastening member 222 of the assembly type coupling structure is formed in the shape of a cylinder protruding from one side of the fixing member 210. The fastening member 222 includes a hook 223 tapered along the outer edge of the upper end of the cylinder. A fastening groove 224 of the assembly type coupling structure is formed at the other side of the fixing member 210 opposite to the fastening member 222 in a cylindrically depressed shape. The fastening groove 224 is provided at the inner circumference thereof with a catching protrusion 225, to which the hook 223 of the fastening member 222 is fastened.

The hook 223 is provided at the upper part thereof with a hollow portion 227, by which the hook 223 is elastically fastened into the fastening groove 224. The fastening member 222 and the fastening groove 224 are formed at each corner portion of the fixing member 210.

Figure 8:
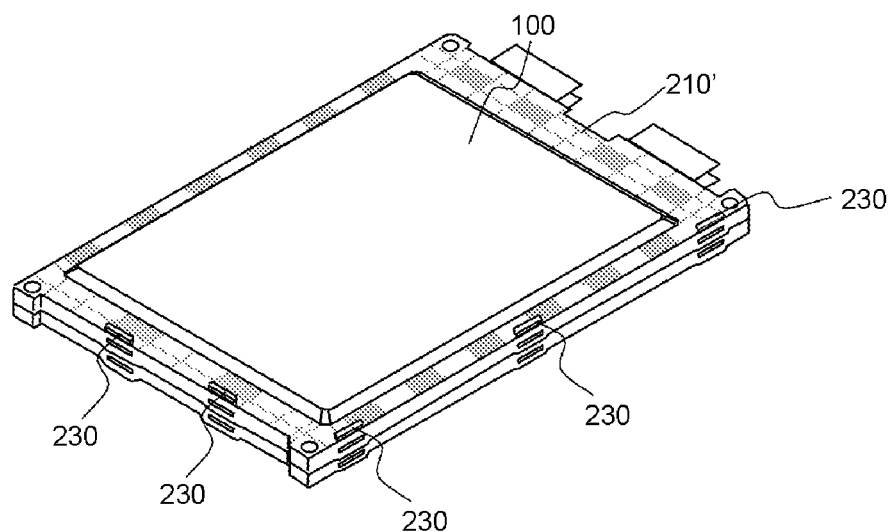
FIG. 8 is a perspective view showing a structure in which two battery cells, one of which is shown in FIG. 4 in a state in which the fixing member is coupled to the battery cell, are stacked.
Figure 9:
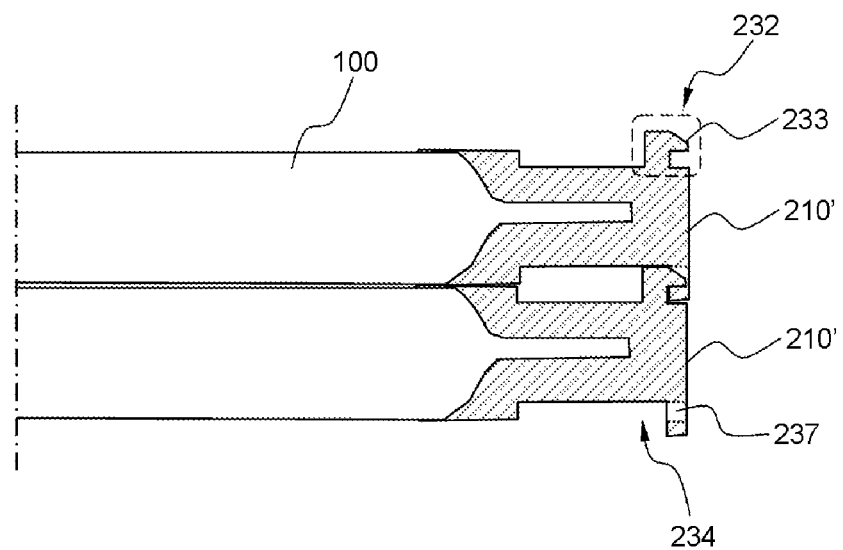
FIG. 9 is a vertical sectional view typically showing an assembly coupling structure of FIG. 8.

FIG. 8 is a perspective view showing a structure in which two battery cells 100, one of which is shown in FIG. 4 in a state in which the fixing member is coupled to the battery cell, are stacked and FIG. 9 is a vertical sectional view typically showing an assembly coupling structure of FIG. 8.

A fastening member 232 of the assembly type coupling structure is formed in a wedge shape protruding while abutting on one side of a fixing member 210'. The fastening member 232 includes a hook 233 tapered outwardly of the fixing member 210'. A fastening groove 234 of the assembly type coupling structure is formed at the other side of a fixing member 210' opposite to the fastening member 232 in a depressed shape corresponding to the wedge shape. The fastening groove 234 is provided with an opening 237, into which the hook 233 of the fastening member 232 is fastened. Pluralities of fastening members 232 and fastening grooves 234 are formed at the edge of the fixing member 210' such that a plurality of fixing members 210' is coupled to each other by coupling between the fastening members 232 and the fastening grooves 234.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery module according to the present invention is configured such that each fixing member is provided with an assembly type coupling structure, by which a plurality of fixing members is coupled to each other. Consequently, the present invention has the effect of easily and simply achieving coupling between the fixing members without a necessity of providing additional fixing member fastening means.

In addition, in a case in which the outer edge of each battery cell and a corresponding fixing member are integrally coupled to each other by insert injection molding, the fixing members can be stably coupled to the respective battery cells without carrying out a process of fixing the fixing members to the respective battery cells in place during a conventional process of assembling the battery module.

The invention claimed is:
1. A battery module comprising:
a battery cell array comprising two or more stacked battery cells, each of which is configured to have a structure in which an electrode assembly, comprising a cathode, an anode, and a separator disposed between the cathode and the anode, is received in a battery case together with an electrolyte in a sealed state; and
fixing members, each of which is integrally coupled to a circumference of one of the battery cells, each of the fixing members being provided with a stack assembly coupling structure, by which the fixing members are coupled to each other such that the battery cell array forms a stable stack structure,
wherein the stack assembly coupling structure comprises a combination of a fastening member formed at one side of each of the fixing members and a fastening groove formed at the other side of each of the fixing members such that the fastening groove corresponds to the fastening member, wherein the fastening member faces an open face of the fastening groove in a stacking direction of the stacked battery cells,
wherein the fastening member is formed at a top or a bottom of each of the fixing members, and the fastening groove is formed at the bottom or the top of each of the fixing members on a position corresponding to the fastening member, and wherein the fastening member is formed in the shape of a cylinder protruding from one side of each of the fixing members and comprises a hook tapered along an outer circumference of an upper end of the cylinder, and wherein the fastening groove is formed at the other side of each of the fixing members opposite to the fastening member in a cylindrically depressed shape and is provided at an inner circumference thereof with a catching protrusion, to which the hook of the fastening member is fastened.

2. The battery module according to claim 1, wherein a circumference of each of the battery cells and one of the fixing members are integrally coupled to each other by insert injection molding.

3. The battery module according to claim 1, wherein each of the battery cells is a plate-shaped battery cell, and wherein the battery cells are stacked such that one side or opposite sides of one battery cell face a corresponding side or corresponding sides of another adjacent battery cell(s) to form the battery cell array.

4. The battery module according to claim 3, wherein the plate-shaped battery cell is a pouch-shaped battery cell manufactured by receiving an electrode assembly in a battery case made of a laminate sheet comprising a resin layer and a metal layer and sealing an outer edge of the battery case by thermal bonding.

5. The battery module according to claim 4, wherein a corresponding one of the fixing members is integrally coupled to the pouch-shaped battery cell such that the fixing member covers the outer edge of the battery cell sealed by thermal bonding.

6. The battery module according to claim 1, wherein each of the battery cells is configured to have a structure in which a cathode terminal and an anode terminal protrude from one side of the outer edge thereof, or a structure in which a cathode terminal protrudes from one side of the outer edge thereof and an anode terminal protrudes from the other side of the outer edge thereof.

7. The battery module according to claim 5, wherein each of the fixing members is integrally coupled to the outer edge of a corresponding one of the battery cells excluding a cathode terminal and an anode terminal.

8. The battery module according to claim 1, wherein the hook is provided at an upper part thereof with one or more hollow portions, by which the hook is elastically fastened into the fastening groove.

9. The battery module according to claim 1, wherein the fastening member and the fastening groove are formed at corner portions of each of the fixing members.

10. The battery module according to claim 1, wherein the fastening member and the fastening groove each comprise one or more fastening members and one or more fastening grooves formed at an edge of each of the fixing members.

11. The battery module according to claim 1, wherein each of the fixing members is made of rubber or plastic.

12. The battery module according to claim 11, wherein each of the fixing members is made of silicone or thermo plastic polyurethane (TPU).

13. The battery module according to claim 1, wherein a cooling fin is disposed at an interface between the respective battery cells.

14. The battery module according to claim 1, wherein each of the battery cells is a lithium secondary battery.

15. A battery pack comprising a battery module according to claim 1 as a unit module.

16. A device comprising a battery pack according to claim 15.

17. The device according to claim 16, wherein the device is an electric vehicle, a hybrid electric vehicle, a plug-in hybrid electric vehicle, or a power storage device.

* * * * *